United States Patent [19]

Kesling

[11] Patent Number: 4,613,183
[45] Date of Patent: Sep. 23, 1986

[54] CAB AND BOX CONSTRUCTION FOR PICKUP TRUCK

[76] Inventor: Peter C. Kesling, Green Acres, LaPorte, Ind. 46350

[21] Appl. No.: 423,858

[22] Filed: Sep. 27, 1982

[51] Int. Cl.[4] .............................................. B60P 9/00
[52] U.S. Cl. .................................. 296/183; 296/190; 296/63
[58] Field of Search ............... 296/10, 26, 37.6, 37.16, 296/180, 183, 184, 39 R, 37.1, 190, 63; 180/89.1; D12/82, 93, 96, 98, 99

[56] References Cited

U.S. PATENT DOCUMENTS

| D. 85,703 | 12/1931 | Martin | D12/96 |
|---|---|---|---|
| D. 267,486 | 1/1983 | Martin, Jr. | D12/96 |
| 1,242,035 | 10/1917 | Pierson et al. | 296/26 |
| 2,530,097 | 11/1950 | Troth | 296/183 |
| 3,405,778 | 10/1968 | Martin | 296/183 |
| 4,181,349 | 1/1980 | Nix et al. | 296/39 R |

FOREIGN PATENT DOCUMENTS

| 1092316 | 11/1960 | Fed. Rep. of Germany | 296/190 |
|---|---|---|---|
| 2140200 | 2/1973 | Fed. Rep. of Germany | 296/37.1 |
| 3003430 | 8/1981 | Fed. Rep. of Germany | 296/37.1 |
| 276887 | 7/1951 | Switzerland | 296/10 |

OTHER PUBLICATIONS

Dodge 1974 Pickup brochure, lithographed Aug. 1973, pp. 3, 10, 11, and 15.

Primary Examiner—Randolph A. Reese
Assistant Examiner—Dennis H. Pedder
Attorney, Agent, or Firm—Lloyd L. Zickert

[57] ABSTRACT

A pickup truck including a cab and a box where the rear of the cab and the front of the box are formed to increase the length of the bed in the box without increasing the overall length of the truck. The increased box length is achieved by utilizing space in the cab usually between the seat and the rear of the cab and/or under the seat.

8 Claims, 7 Drawing Figures

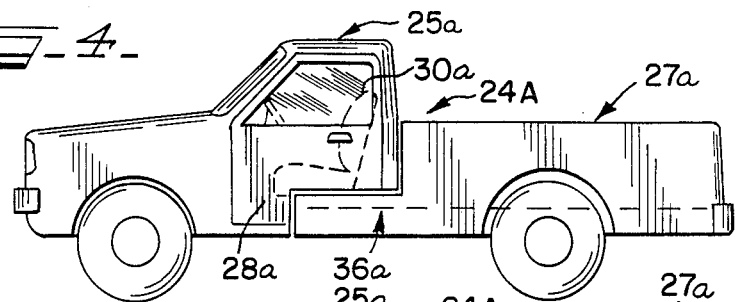
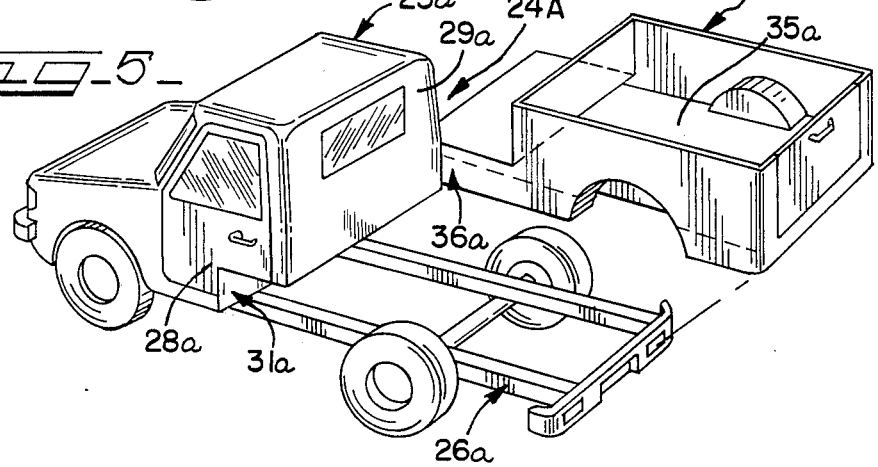
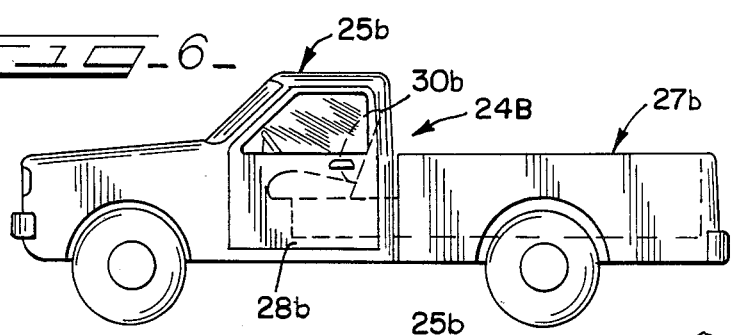
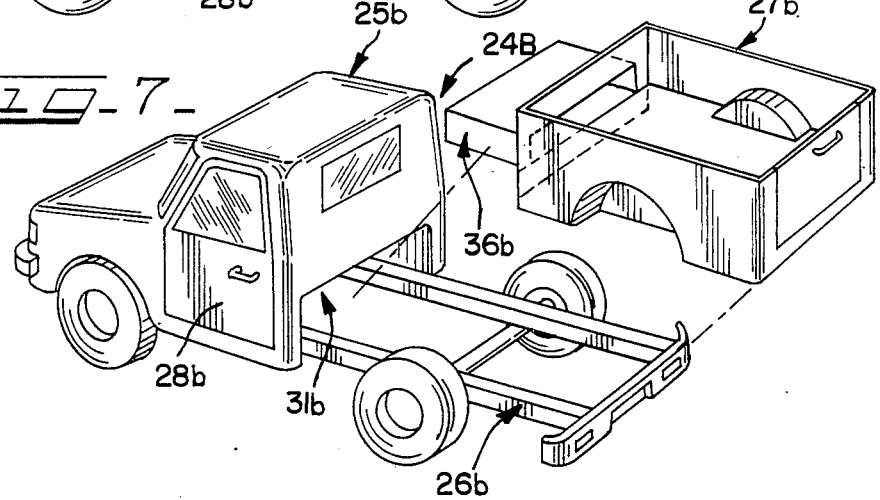

CAB AND BOX CONSTRUCTION FOR PICKUP TRUCK

This invention relates in general to a pickup truck, and more particularly to a pickup truck including a cab and a box wherein the length of the bed of the box is increased without increasing the overall length of the truck by utilizing space in the cab between the seat and the rear of the cab and/or under the seat.

BACKGROUND OF THE INVENTION

It is well known that the usual pickup truck includes a cab and a separate box immediately behind the cab wherein the bed of the box is equal to the length of the box and the distance from the rear of the cab to the rear of the truck. Thus, with a conventional pickup truck it is not possible to increase the length of the bed in the box without increasing the overall length of the truck. It is generally objectionable to increase the overall length of a truck which would then take up more space. With the recent advent of high fuel costs, there have been a number of smaller trucks designed and marketed. However, such smaller trucks also have shorter boxes which thereby limits the overall length of any boards or elongated structures that may be carried by the box and laid flat in the bed of the box. Thus, the use of such smaller trucks is limited to the handling of boards and elongated structures of shorter lengths where it is desired to lay those boards or structures down flat in the bed of the box.

SUMMARY OF THE INVENTION

The present invention overcomes the above noted difficulties of presently constructed smaller trucks by forming the cab and box of a truck to utilize the space behind the seat in the cab and/or under the seat so that the bed of the box can be increased in length to handle longer boards and/or elongated structures that may be then laid flat in the box.

According to the present invention, recessed areas may be formed at the rear of the cab into which mating front ends of a box may project in order to lengthen the bed of the box without increasing the overall length of the truck. For example, where present trucks having a box with a bed six-and-one-half feet long would restrict the carrying of boards and elongated structures to that length, the box bed would be increased by the present invention such as to provide an eight-foot long bed by utilizing the space behind the seat in the cab and/or under the seat without increasing overall truck length.

It is an object of the present invention to provide a new and improved pickup truck structure which would include a cab and a box and which would utilize the space behind the seat in the cab and/or under the seat for extending the bed of the box to increase the bed length and permit the carrying of longer articles without increasing the overall length of the truck.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 4 is a side elevational view of another form of pickup truck according to the invention;

FIG. 5 is an exploded perspective view of the truck in FIG. 4 and illustrating the manner in which the box coacts with the truck frame and cab;

FIG. 6 is a side elevational view of a still further modified pickup truck according to the invention; and FIG. 7 is an exploded perspective view of the truck in FIG. 6 and illustrating the manner in which the box coacts with the truck frame and box.

DESCRIPTION OF THE PREFERRED EMBODIMENTS

Figure 1:
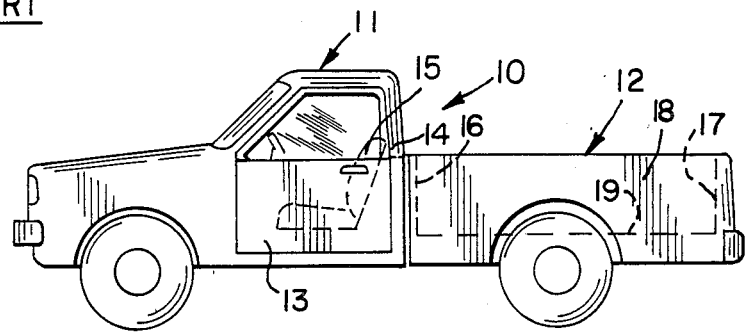
FIG. 1 is a side elevational view of a pickup truck which depicts the prior art and illustrating in dotted lines the seat in the cab and the interior size of the box.

Referring now to the drawings, and particularly to FIG. 1, a pickup truck is illustrated which represents the prior art. The truck is generally designated by the numeral 10 and includes a cab 11 and a separate box 12. The cab is provided with doors 13 on opposite sides although only one is shown, and a back wall 14. A seat 15 for the driver and/or passenger is illustrated within the cab. The seat includes a generally horizontal seat cushion and an upstanding seat back. The box includes a front wall 16 immediately adjacent the rear wall 14 of the cab, a rear wall 17, opposed side walls 18, and a bottom wall, floor, or bed 19. Accordingly, the length of the bed or bottom wall 19 is determined by the disposition of the upstanding front wall 16 and the upstanding rear wall 17. In order to increase the length of the bed or floor 19, it would be necessary to increase the overall length of the box, thereby increasing the overall length of the truck.

Figure 2:
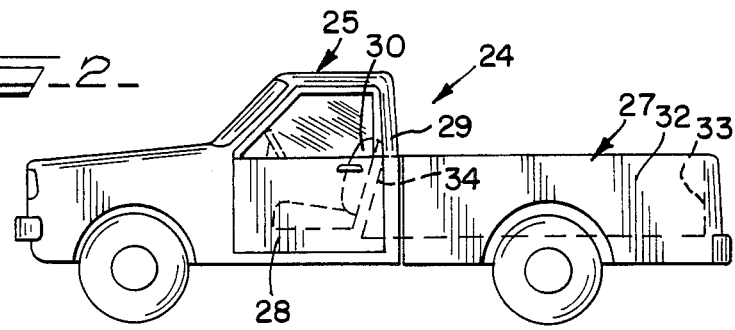
FIG. 2 is a side elevational view of one form of pickup truck constructed according to the invention and illustrating by comparison the larger box size for a truck of the same length as in FIG. 1.
Figure 3:
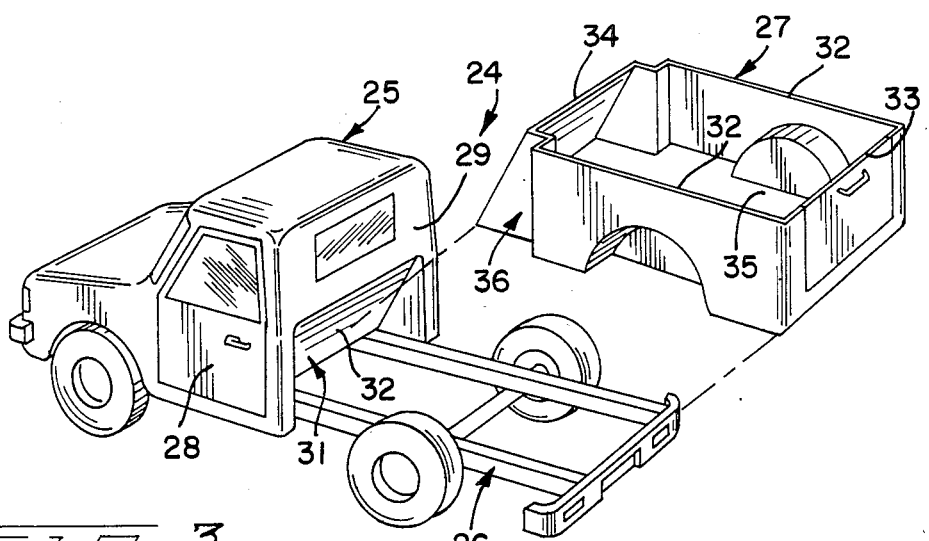
FIG. 3 is an exploded perspective view of the truck of FIG. 2 illustrating the manner in which the box coacts with the truck frame and cab.

One embodiment of the present invention is illustrated in FIGS. 2 and 3, wherein the truck is generally designated by the numeral 24 and includes a cab 25 associated with the usual frame 26 and a separate box 27 mounted on the frame and coacting with the cab.

The cab 25 is defined by opposed walls having opposed doors 28, only one of which is shown, and a rear wall 29. A seat 30 is shown within the cab. For simplicity reasons, the other parts of the cab are not specifically described although it will be appreciated they may be of the usual type found in pickup trucks. The lower end of the rear wall 29 is notched at 31 such that transversely it is triangular in cross section, thereby defining an inclined wall 32 which from the lower edge of the back wall 29 extends downwardly and inwardly utilizing space in the cab 26 behind and/or under the seat 30, as particularly illustrated in FIG. 2.

The separate box 27 includes opposed upstanding side walls 32, a rear end wall 33, a front end wall 34, and a bottom wall or floor or bed 35, thereby defining an open box at the top into which articles may be placed. The front wall 34 is inclined downwardly and forwardly and a part of a forwardly projecting extension 36 which mates with the notched portion 31 of the cab and which thereby increases the length of the box bed by the amount of the extension 36 so that longer boards and articles may be placed in the box along the bed. This increase in length does not increase the overall length of the truck. Yet, it utilizes unused space in the cab of the truck such that the floor length of the box is greater than the distance from the top of the seat back to the rear wall of the cab. As above mentioned, instead of limiting the box to receiving articles of one length which would be equal to the distance from the rear wall of the cab to the rear wall of the box, the box is now capable of taking a longer object or article making it more useful.

A modification of the invention is shown in FIGS. 4 and 5 which is generally identified as 24A and which differs from the embodiment of FIGS. 2 and 3 in the particular structural parts of the cab and box which coact to increase the length of the box and also illustrating how the box may extend beneath the seat. The cab is identified as 25a, the frame as 26a, and the box as 27a. The rear wall 29a of the cab is fully notched across its entire width at 31a, and which transverse section is generally rectangular in shape. Further, the extension 36a on the front of the box 27a is similarly shaped to fit in the notched area 31a and partly under the seat 30a for the purpose of increasing the length of the box bed 35a. Thus, the shape of the notch in this embodiment differs from that in the embodiment of FIGS. 2 and 3, and further the notch also extends through the doors 28a of the cab and effectively into the cab area and under the seat.

The embodiment of FIGS. 6 and 7 is generally designated as 24B and differs from the embodiment of FIGS. 4 and 5 only in that the rear of the cab 25b is notched at 31b in a similar fashion as the notched area 31 in the embodiment of FIGS. 2 and 3. Accordingly, the extension 36b of the box 27b is formed to fit in the notched area 31b but not through the doors 28b, and which is again received on the frame 26b in the area of the cab behind and under the seat 30b to extend the length of the box floor for receiving articles to a length longer than the distance from the seat back to the rear end panel of the box. Thus, elements, parts and the like having a length greater than the distance from the seat back to the back panel of the box can be easily carried in the box.

It may be appreciated that any number of geometrical shapes may be provided for the front end of a box to be received in the back end of a cab for purposes of extending the length of the box and utilizing unused space within the cab and for ultimately increasing the length of the box without increasing the overall length of the truck.

It will be understood that modifications and variations may be effected without departing from the scope of the novel concepts of the present invention, but it is understood that this application is to be limited only by the scope of the appended claims.

The invention is hereby claimed as follows:

1. A pickup truck having a cab and a separate box, said cab having at least opposed walls with doors, a rear wall and a seat therein for the driver or a driver and a passenger, said seat including a generally horizontal seat cushion and an upstanding seat back, said box having opposed side and end walls upstanding from a bottom wall or floor defining an open top and being immediately behind said cab, the box end wall at the cab and the cab rear wall below the top of the seat back being formed to extend into the cab and define a box having a floor length greater than the horizontal distance from the bottom of the seat back to the rear end wall of the box to provide a longer box at the bottom wall or floor for receiving elements longer than said distance while maintaining the same overall truck length.

2. A pickup truck as defined in claim 1, wherein said cab rear wall includes a transversely disposed recessed area triangular in cross section and said box includes a mating front end which extends the length of the box bottom to increase the bed capacity of the box.

3. A pickup truck as defined in claim 1, wherein said cab rear wall includes a transversely disposed recessed area rectangular in cross section and said box includes a mating front end which extends the length of the box bottom to increase the bed capacity of the box.

4. A pickup truck as defined in claim 1, wherein said cab rear wall includes a transversely extending notched area through the doors and said box includes a mating front end which extends the length of the box bottom to increase the bed capacity of the box.

5. A pickup truck having a cab and a separate open box, said cab having at least opposed walls with doors, a substantially vertical rear wall and a seat therein for the driver or a driver and a passenger, said seat including a generally horizontal seat cushion and an upstanding seat back, said box having substantially vertical opposed side and opposed front and rear end walls upstanding from a bottom wall or floor defining an open top and said front end wall being immediately behind said cab rear wall, a forwardly projecting lower cab rear wall portion and a portion of said box front end wall at the floor generally mating with said forwardly projecting portion and extending ahead of said substantially vertical rear wall and at least under a portion of the seat for increasing the box length, without increasing the entire length of the truck, to a length greater than the horizontal distance from the substantially vertical rear wall of the cab to a vertical plane passing through the rear end wall of the box, said portion extending across substantially the entire width of said box.

6. A pickup truck having a cab and a separate box, said cab having at least opposed walls with doors, a rear wall, and a seat therein for the driver or a driver and a passenger, said seat including a generally horizontal seat cushion and an upstanding seat back, said box having opposing side walls and front and back end walls upstanding from a bottom wall or floor defining an open top and being immediately behind said cab, a forwardly projecting extension at the box front end wall and at floor level extending into a mating area in the cab below the seat cushion to define the box at the floor level as having a length greater than the horizontal distance from the bottom of the seat back to the back end wall of the box thereby providing a longer box length at the bottom wall or floor for receiving elements longer than said distance while maintaining the same overall truck length.

7. A pickup truck having a cab and a separate open box, said cab having at least opposed walls with doors, a rear wall and a seat therein for the driver or a driver and a passenger, said seat including a generally horizontal seat cushion and an upstanding seat back, said box having opposed side and opposed front and rear end walls upstanding from a bottom wall or floor defining an open top and being immediately behind said cab, and means at the rear of the cab coacting with means on the front end of the box for increasing the box length, without increasing the entire length of the truck, to a length greater than the horizontal distance from the bottom of the seat back to a vertical plane passing through the rear end wall of the box, said cab means including a notched area under the seat at the cab rear wall and said box including a mating portion at the front end thereof interfitting with said notched area.

8. A pickup truck having a cab and a separate open box, said cab having at least opposed walls with doors, a rear wall and a seat therein for the driver or a driver and a passenger, said seat including a generally horizontal seat cushion and an upstanding seat back, said box having opposed side and opposed front and rear end walls upstanding from a bottom wall or floor defining an open top and being immediately behind said cab, and means at the rear of the cab coacting with means on the front end of the box for increasing the box length, without increasing the entire length of the truck, to a length greater than the horizontal distance from the bottom of the seat back to a vertical plane passing through the rear end wall of the box, said cab means including a notched area along the entire rear end of the cab under the seat and through the doors and said box including a mating portion at the front end thereof interfitting with said notched area.

* * * * *